(12) United States Patent
Rowell et al.

(10) Patent No.: US 7,285,052 B1
(45) Date of Patent: *Oct. 23, 2007

(54) INTERMEDIATE SHAFT ASSEMBLY

(75) Inventors: Brian G. Rowell, Saxtons River, VT (US); Robert C. Warnke, Spooner, WI (US)

(73) Assignee: Sennax Industries, Inc., Bellows Falls, VT (US)

( * ) Notice: Subject to any disclaimer, the term of this patent is extended or adjusted under 35 U.S.C. 154(b) by 282 days.

This patent is subject to a terminal disclaimer.

(21) Appl. No.: 11/087,296

(22) Filed: Mar. 22, 2005

Related U.S. Application Data (63) Continuation-in-part of application No. 10/223,101, filed on Aug. 19, 2002, now Pat. No. 6,875,111.

(51) Int. Cl.
*F16C 3/00* (2006.01)

(52) U.S. Cl. .......................... 464/7; 464/183

(58) Field of Classification Search ............. 403/359.3, 403/359.6; 464/7, 183; 476/8; 475/159, 475/160; 137/123, 153, 331; 415/111, 112, 415/88; 184/6.16
See application file for complete search history.

(56) References Cited

U.S. PATENT DOCUMENTS

| | | | |
|---|---|---|---|
| 2,551,623 A * | 5/1951 | More ................ | 184/6.16 X |
| 2,844,947 A * | 7/1958 | Shipley .................. | 464/7 |
| 3,399,549 A * | 9/1968 | Nagele ............... | 403/359.6 X |
| 3,475,992 A | 11/1969 | West, Jr. et al. | |
| 5,005,437 A | 4/1991 | Furer et al. | |
| 5,503,478 A | 4/1996 | Blaine | |
| 5,810,116 A | 9/1998 | Kaptrosky | |
| 6,110,070 A | 8/2000 | Nagai et al. | |
| 6,875,111 B1 * | 4/2005 | Rowell et al. ................. | 464/7 |
| 7,052,402 B2 * | 5/2006 | Ichikawa et al. .... | 403/359.6 X |

* cited by examiner

*Primary Examiner*—Greg Binda
(74) *Attorney, Agent, or Firm*—Clifford F. Rey (57) ABSTRACT

An intermediate shaft assembly for an automotive transmission wherein hydraulic fluid intake ports in the rotating shaft assembly are designed to increase hydraulic fluid flow and improve lubrication to mating components served by the shaft lubrication circuit is disclosed. The hydraulic fluid intake ports are laterally offset from the center plane of the shaft assembly to increase the angle of entry to fluid entering the intake ports and configured to produce a scooping effect within the fluid surrounding the intake ports upon shaft rotation, which substantially increases hydraulic flow into the shaft and counteracts the inhibitory effect of centrifugal force on fluid flow within the ATF intake ports. In addition, the present intermediate shaft assembly includes a flexible transitional diameter to impart axial flexion to the shaft during peak torque events and also provides semicircular spline relief grooves, which reduce areas of stress concentration and potential breakage of the shaft.

15 Claims, 9 Drawing Sheets

VIEW A

FIG. 7

VIEW B

FIG. 8

VIEW C

FIG. 9

VIEW D

INTERMEDIATE SHAFT ASSEMBLY

CROSS-REFERENCE TO RELATED APPLICATION

This application is a continuation-in-part of U.S. patent application Ser. No. 10/223,101 filed Aug. 19, 2002, now U.S. Pat. No. 6,875,111, entitled Intermediate Shaft Assembly and claims the benefits thereof under 35 U.S.C. 120.

BACKGROUND OF INVENTION

The present invention relates generally to the field of automatic transmission systems and, more particularly, to a replacement intermediate shaft assembly for the Chrysler A518 and A618 and other similar transmissions.

The intermediate shaft assembly in the aforementioned Chrysler A518 and A618 transmissions (hereinafter "transmissions") is located within and extends through the aft transmission housing and overdrive piston retainer mounted thereon and functions generally to interconnect the reverse drum component within the transmission housing to the overdrive assembly attached to the exterior of the housing. The intermediate shaft assembly including the structural features thereof also comprises an integral portion of the transmission lubrication circuit as hereinafter explained.

The original equipment manufacture (hereinafter "OEM) intermediate shaft assembly of the Chrysler transmissions is susceptible to premature wear on its integral bearing surfaces and external splines, and delivers inadequate lubrication to the front planetary gears, the overdrive planetary gears, and to the overdrive support causing premature wear of many surrounding parts. This is due primarily to the design of the automatic transmission fluid (hereinafter "ATF") inlets within the OEM intermediate shaft, which fails to provide a sufficient flow of ATF to the aforementioned components under normal operating conditions.

Another recurring problem in the OEM intermediate shaft is stress cracking and eventual breakage of the shaft, which typically occurs at the rearward end thereof in proximity to the spline relief grooves machined adjacent the external spline formed on the shaft. The OEM intermediate shafts are also internally drilled to distribute lubrication to the various planetary gears and bearings throughout the transmission. Any such discontinuity in a machine part alters the stress distribution in the area of the discontinuity. Such discontinuities are called stress raisers, and the regions in which they occur are called areas of stress concentration.

The mechanical stresses imposed on the OEM intermediate shaft during peak torque events can produce stress cracks within such spline relief grooves due to their configuration and proximity to the internal lubrication passages drilled in the shaft. Once a crack is initiated, the stress concentration effect becomes greater and the crack progresses more rapidly. As the stressed area decreases in size, the stress increases in magnitude until the remaining area suddenly fails.

Thus, the present invention has been developed to resolve this problem by providing a direct replacement intermediate shaft assembly for the Chrysler transmissions, which provides improved ATF flow within the shaft and delivers a sufficient flow of lubrication to the front planetary gears, the overdrive planetary gears, and other components served by the shaft lubrication circuit. The present intermediate shaft also provides spline relief grooves and bearing journal relief grooves which are semicircular in cross-section to reduce areas of stress concentration.

SUMMARY OF THE INVENTION

Accordingly, the present invention provides an intermediate shaft assembly wherein the ATF intake ports in the present shaft have been reconfigured to increase the angle of entry to ATF entering the intake ports thereby creating a "scooping" or funneling effect upon shaft rotation, which substantially increases ATF flow into the shaft bore and counteracts the inhibitory effect of centrifugal force on fluid flow within the ATF intake ports. In turn, increased ATF flow is provided to the forward planetary gears, overdrive planetary gears, and other components served by the shaft lubrication circuit.

In addition, the size and number of ATF outlets at specific locations on the present shaft has been increased to deliver the enhanced ATF flow to the aforementioned components. Further, the calibrated plug orifices which form part of the present intermediate shaft assembly and its internal lubrication system are constricted in the present design in order to reduce ATF flow from the ends of the shaft thereby generating backpressure and increased ATF flow from the lubrication outlets to the aforementioned components.

In addition, the present intermediate shaft assembly includes a flexible transitional diameter to impart axial flexion to the shaft during peak torque events and also provides spline relief grooves and bearing journal relief grooves that are semicircular in cross-section, which minimizes the stress concentration effect of the grooves and substantially reduces stress fractures and breakage of the shaft.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
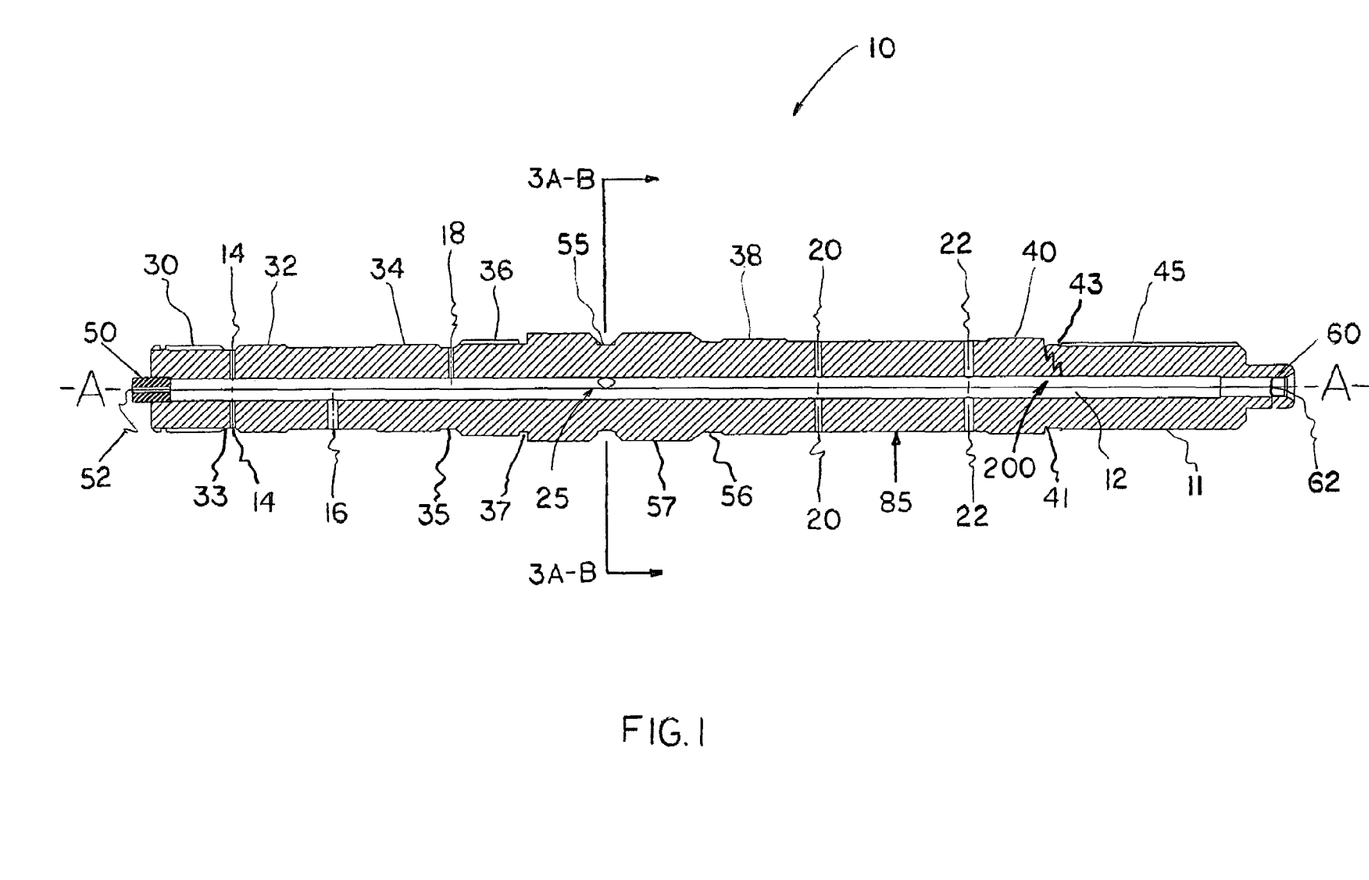
FIG. 1 is a longitudinal cross-section of the intermediate shaft assembly of the present invention showing details of the construction thereof.

With further reference to the drawings there is shown therein a replacement intermediate shaft assembly for the Chrysler transmissions in accordance with the present invention, indicated generally at 10 and illustrated in FIG. 1.

Figure 5:
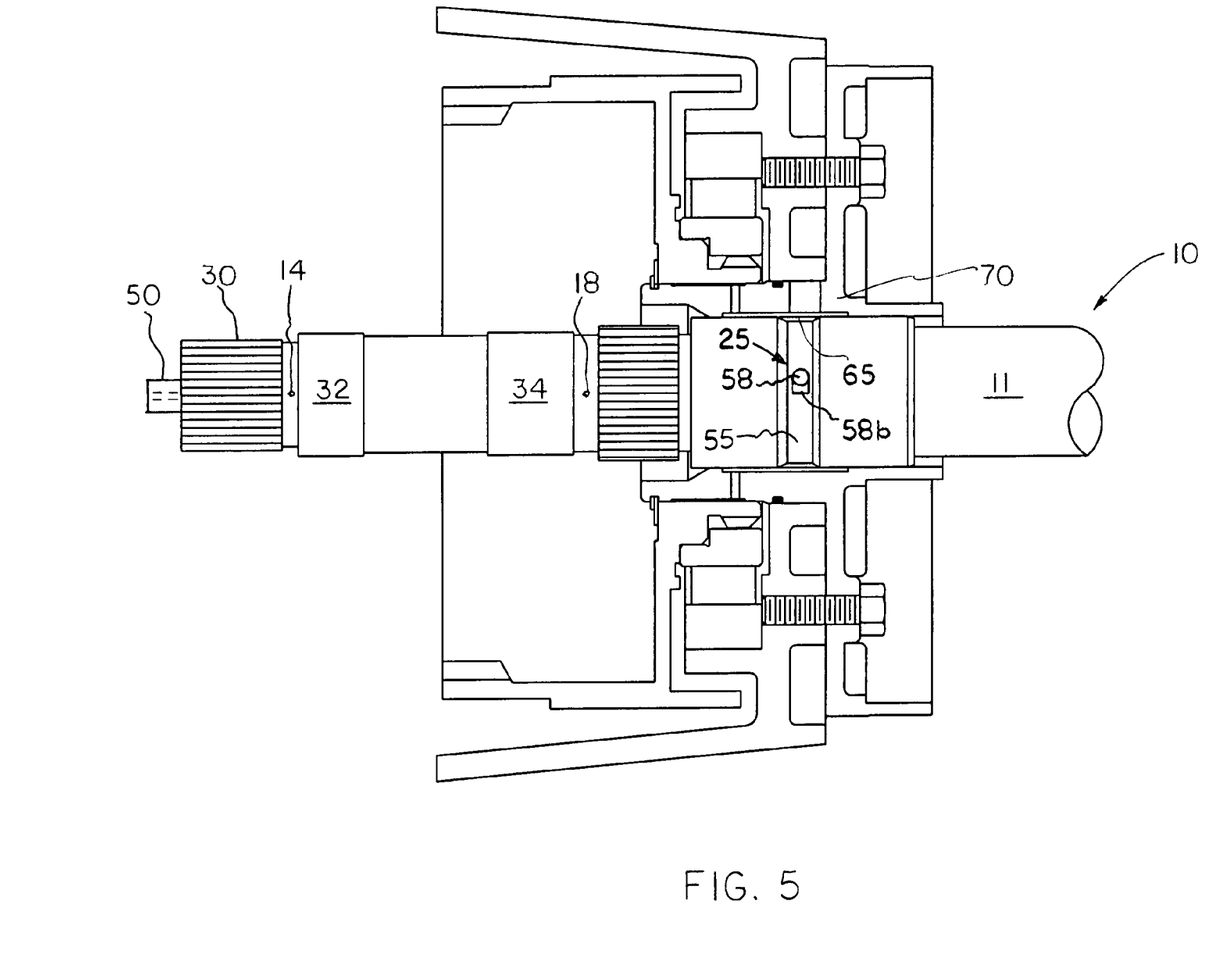
FIG. 5 is a partial horizontal cross-section taken through the reverse drum component, overdrive piston retainer, and transmission housing showing the present intermediate shaft assembly in its functional position.

The present intermediate shaft assembly 10 includes an elongated, generally cylindrical body member 11 having a central gallery or bore 12 formed along the longitudinal axis -A- thereof comprising a critical portion of the lubrication circuit within the transmissions. The central bore 12 is formed in fluid communication with a plurality of ATF inlets, outlets, and end plug orifices, which deliver ATF under system pressure to provide lubrication for components mounted on the shaft 10 such as the front planetary gears, the overdrive planetary gears, and other mating parts (FIG. 5). It will be appreciated that in the present shaft assembly 10, the ATF inlets, outlets, and end plug orifices are calibrated to predetermined dimensions to accurately meter the flow of ATF passing through the shaft assembly based on the lubrication requirements of the planetary gears and related components served by the lubrication circuit.

More particularly, at its forward end (i.e. left end in FIG. 1) the present intermediate shaft assembly 10 includes two Ø 0.063 inch ATF feed holes 14 drilled intermediate the front planetary spline 30 and a first front sungear journal 32 for delivery of ATF to this portion of the shaft. The shaft 10 also includes one Ø 0.136 inch feed hole 16 drilled in body member 11 intermediate the first and second front sungear journals 32 and 34 respectively for delivery of ATF to this location. Similarly, the shaft 10 includes another Ø 0.063 inch feed hole 18 drilled intermediate the second front sungear journal 34 and the rear planetary spline 36 for delivery of ATF to this portion of the shaft.

At its rearward end the intermediate shaft assembly 10 includes two Ø 0.094 inch feed holes 20 drilled in body member 11 adjacent the first aft sungear journal 38 for delivery of ATF to this portion of the shaft. The shaft assembly 10 also includes two Ø 0.125 inch feed holes 22 drilled in body member 11 adjacent the second aft sungear journal 40 for delivery of ATF to this location. That portion of the body member 11 between the first sungear journal 38 and the second aft sungear journal 40 is designated as a transitional diameter 85. Shaft assembly 10 also includes an overdrive planetary spline 45 formed thereon for mating engagement with the overdrive planetary gear assembly (not shown).

The present intermediate shaft assembly 10 provides structures comprising fluid metering means including, but not limited to, the following structures. Shaft assembly 10 includes an end pin, indicated generally at 50, having a calibrated center orifice 52 formed therein, which meters the flow of ATF from the forward end of the shaft assembly. The end pin 50 is installed to an interference fit in the forward end of the internal bore 12 as shown in FIG. 1. Shaft assembly 10 also includes an end plug, indicated generally at 60, having a calibrated center orifice 62, which is installed to an interference fit in the aft end of the bore 12 as shown. The orifices 52 and 62 function to regulate the flow of ATF from either end of central bore 12 thereby generating hydraulic fluid backpressure within the bore increasing the volume of ATF discharged through the aforementioned ATF feed holes 14, 16, 20, and 22. In one embodiment, among others, the size of the orifices 52, 62 within the end pin and end plug components 50, 60 respectively has been reduced from Ø 0.100 inch in the OEM design to the present Ø 0.075 inch. However, the calibrated orifices 52, 62 may vary in the range of Ø 0.050-Ø 0.090 inch in order to adjust the fluid backpressure and, thus, the volume of ATF to be discharged through the ATF feed holes 14, 16, 20, and 22 to the planetary gears in a given transmission.

Figure 2:
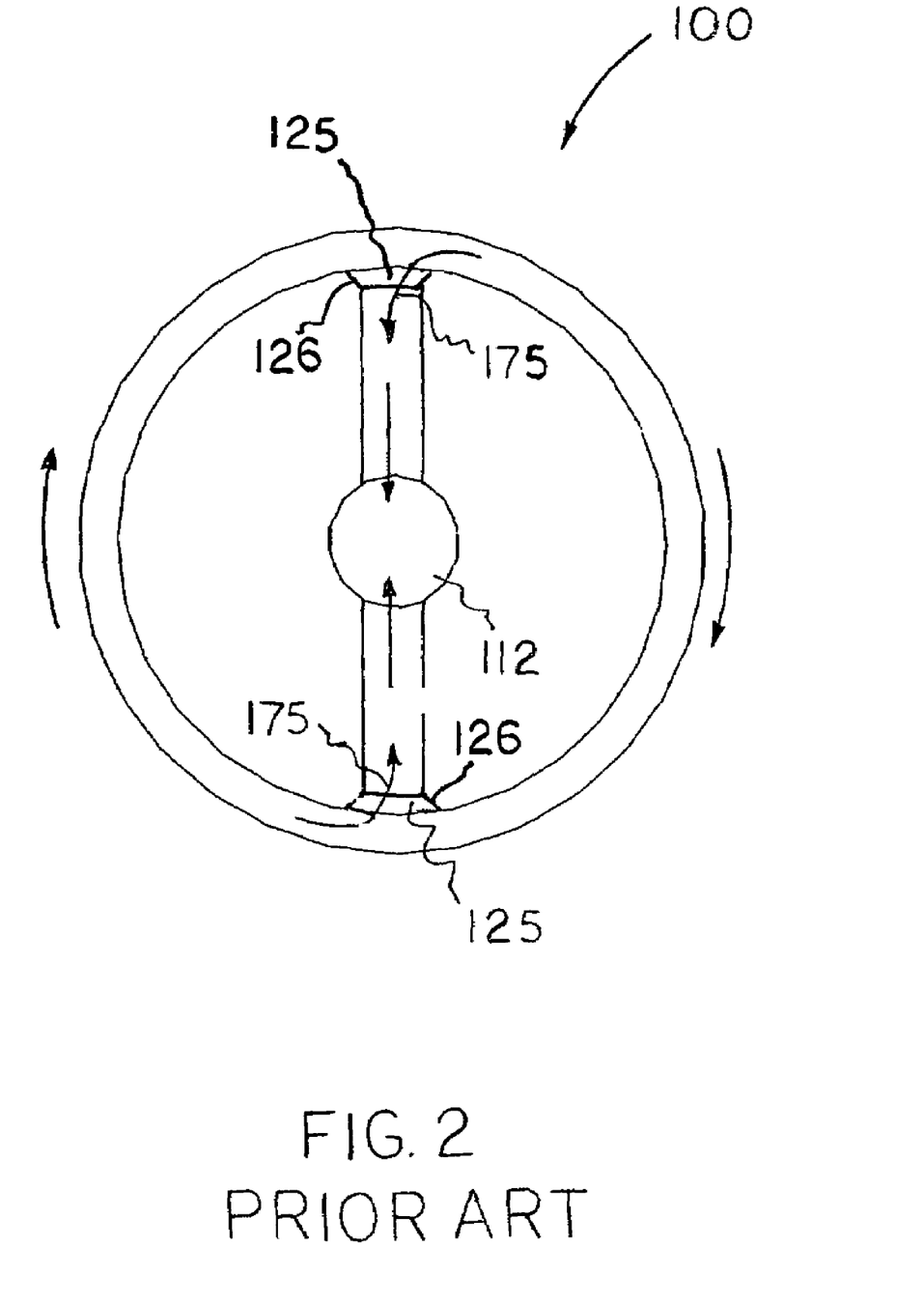
FIG. 2 is a cross-sectional view of the intermediate shaft assembly of the Prior Art.

A critical problem to be considered in the present redesign of the OEM intermediate shaft is that the centrifugal force of the ATF being drawn into the shaft assembly 10 at the ATF inlet site 25 (FIG. 1) acts against the intended ATF flow into such fluid inlet as hereinafter described. That is, high-speed rotation of the shaft 10 tends to direct the flow of any ATF in the fluid inlets in a radially outward direction by centrifugal force. This problem is compounded in the OEM intermediate shaft, indicated generally at 100, and shown in cross-section in FIG. 2, wherein the ATF inlet 125 is comprised of only a single Ø 0.187-0.198 inch hole (depending on model year) extending through the bore 112 along the vertical centerline of the OEM shaft 100. Thus, ATF entering the inlet hole 125 must undergo an abrupt change in direction to enter the bore 112 as shown by arrows 175 when the shaft 100 is rotated in the clockwise direction as illustrated in FIG. 2. A heavy chamfer 126 (FIG. 2) machined around the inlet hole 125 in the OEM shaft 100 also tends to deflect fluid flow and further impedes ATF entry into the inlet hole.

Figure 4:
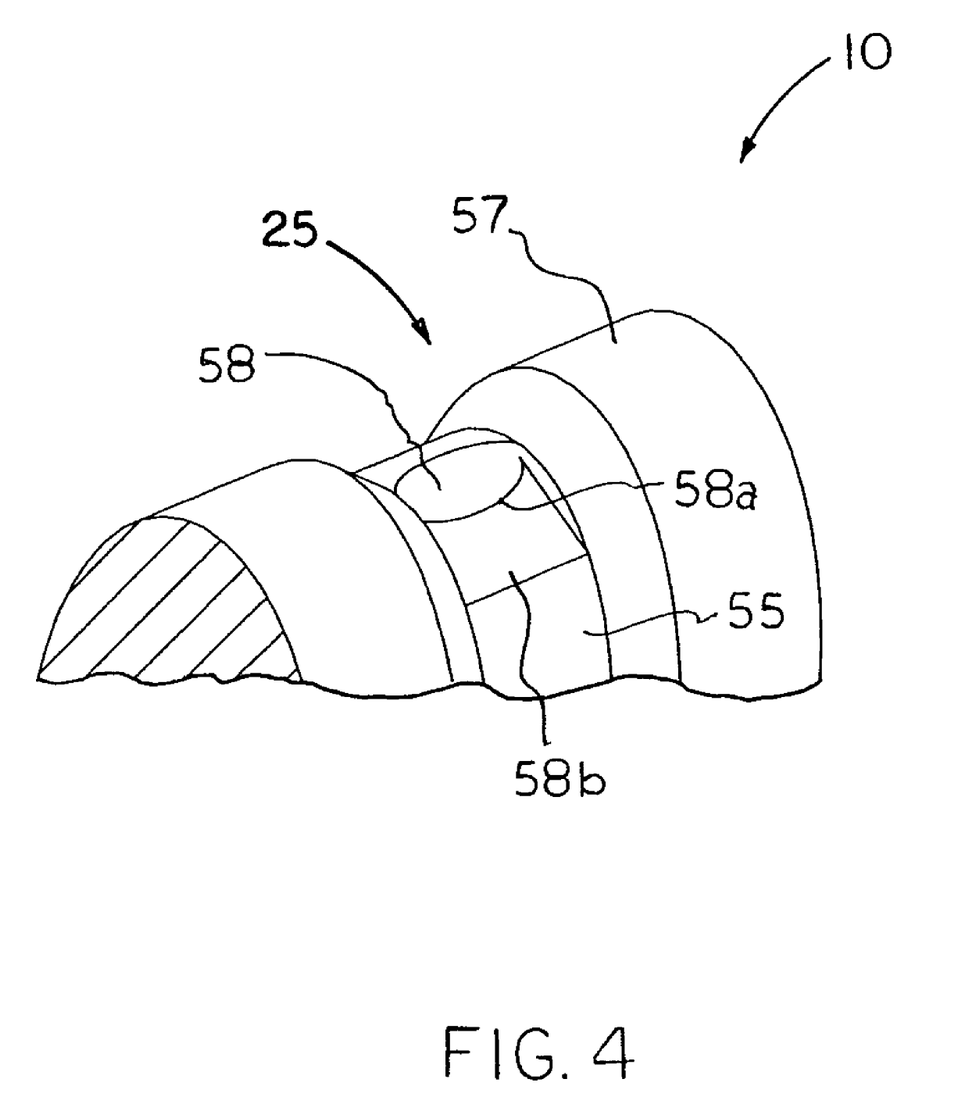
FIG. 4 is an enlarged perspective view of a primary ATF inlet site in the present intermediate shaft assembly showing the modified configuration thereof.

To resolve this problem the present shaft assembly 10 is provided with structures comprising fluid intaking means including, but not limited to, the following structures. At its approximate mid-section the present shaft assembly 10 includes an ATF inlet site, indicated generally at 25, (FIG. 1) wherein ATF is drawn into the central bore 12 for delivery to the ATF feed holes 14, 16, 20, and 22. The inlet site 25 is located within the annular groove 55 formed in the piston retainer journal 57 as most clearly shown in FIG. 4. In the present invention the annular groove 55 has a smaller outside diameter in comparison to the OEM design to provide a larger space as at 65 (FIG. 5), which functions as an ATF reservoir retaining an increased quantity of ATF therein and, thus, facilitating ATF flow into the inlet site 25.

Figure 3A:
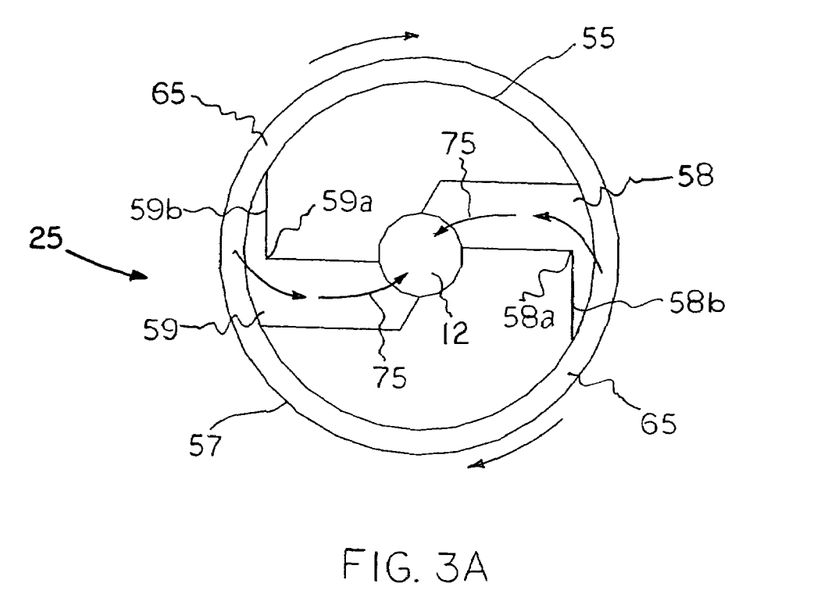
FIG. 3A is a cross-sectional view of the present intermediate shaft assembly taken along section line 3A-3A of FIG. 1 showing the configuration of the fluid intake ports.
Figure 3B:
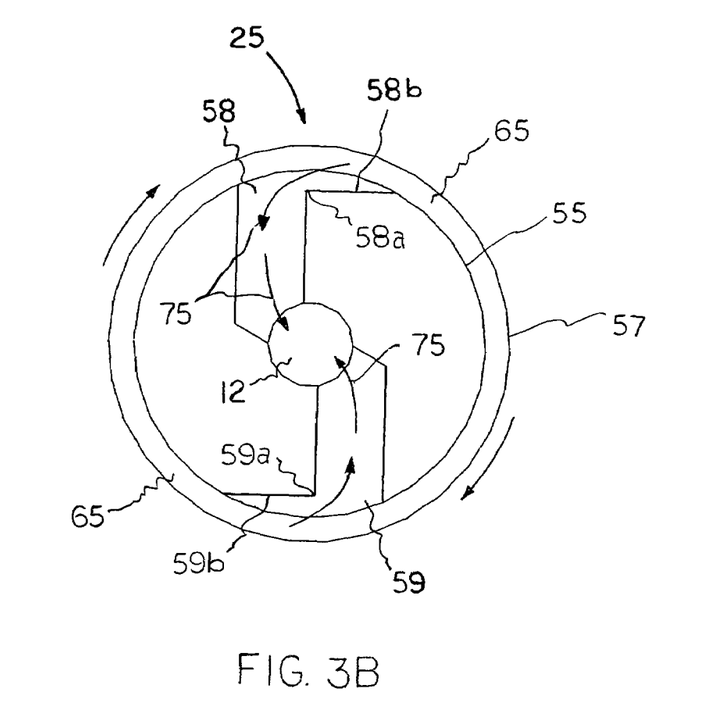
FIG. 3B is a cross-sectional view of the present intermediate shaft assembly taken along the section line 3B-3B and rotated 90 degrees from the position shown in FIG. 3A.

As shown in FIGS. 3A and 3B, the present ATF inlet site 25 is comprised of two Ø 0.250 inch ATF intake ports 58, 59 which are formed in fluid communication with the bore 12. Intake ports 58, 59 are located at predetermined lateral offset positions relative to the longitudinal axis -A-. In one embodiment, among others, the lateral offset dimension of each ATF intake port 58, 59 is in the range of 0.125-0.156 inches from a transverse plane extending through shaft 10 and including the longitudinal axis -A-. The lateral offset dimension corresponds to one-half of the inside diameter dimension of the bore 12, which ranges from Ø 0.250-Ø 0.3125 inches in the present shaft. It will be appreciated by those skilled in the art that the lateral offset position of intake ports 58, 59 effectively increases the angle of entry to ATF flow entering the intake ports upon clockwise rotation (i.e.

viewed in the aft direction in FIGS. 3A and 3B) of the shaft within the ATF-filled space 65.

Still referring to FIGS. 3A and 3B, it can also be seen that the leading edges as at 58a, 59a of each ATF intake port 58, 59 have been altered by machining contiguous undercut surfaces 58b, 59b respectively at the juncture of each port 58, 59 with the annular groove 55. Upon clockwise rotation of the present shaft assembly 10 as shown in FIGS. 3A-3B, it will be understood that a so-called "scooping" or funneling effect is created when the shaft 10 is in operation. That is, as intake ports 58, 59 are rotated within the ATF-filled space as at 65 between the annular groove 55 and the piston retainer 70 (FIG. 5), ATF is effectively "scooped" into the ATF intake ports 58, 59 as shown by arrows 75 in FIGS. 3A-3B due to the configuration of the undercut surfaces 58b, 59b in combination with the increased angle of entry provided by the lateral offset position of the intake ports 58, 59.

Advantageously, the present intake ports 58, 59 function to increase the volume of ATF flow into the shaft assembly 10 counteracting the centrifugal force of the ATF generated upon shaft rotation. Thus, the increased ATF flow into the central bore 12 of the shaft assembly 10 in combination with the restriction of ATF flow through orifices 52, 62 produces a corresponding increase in ATF output from feed holes 14, 16, 18, 20, and 22, providing improved lubrication to the planetary gear assemblies and other components installed on the shaft.

It will be noted that the present shaft assembly 10 is fabricated from AISI 4140 steel hardened to HRC 50-55, which is designed to reduce wear effects and to more than compensate for any increased shear stress created by the enlargement of the ATF feed holes and intake ports as described hereinabove.

Figure 6:
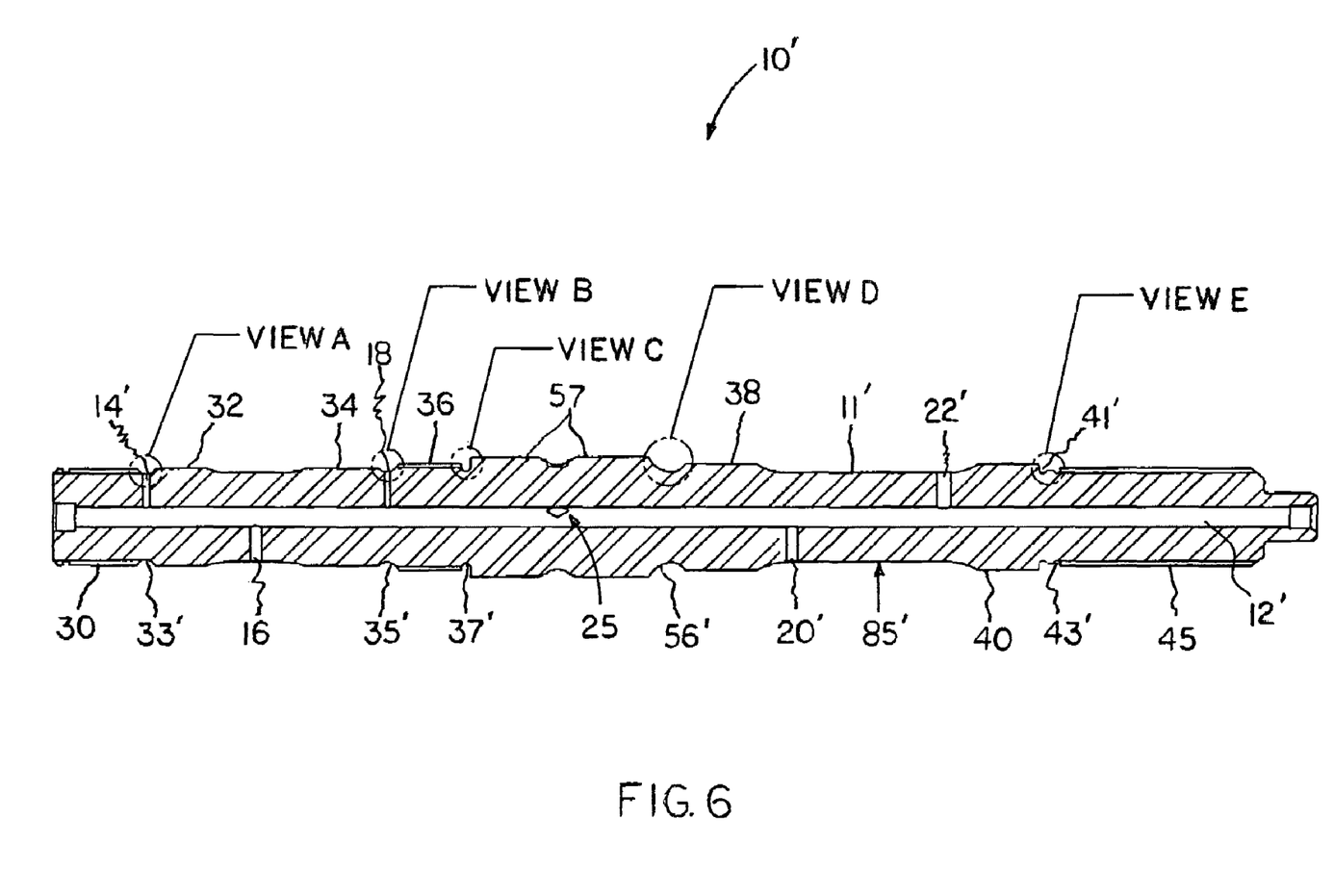
FIG. 6 is a longitudinal cross-section of another embodiment of the intermediate shaft assembly of the present invention showing details of the construction thereof.
Figure 7:
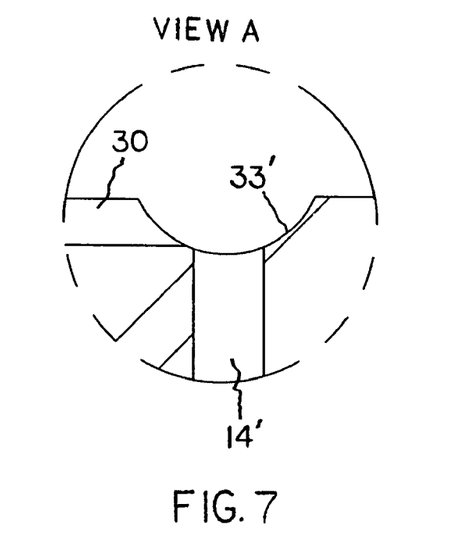
FIG. 7 is an enlarged partial cross-section of the outlined area in FIG. 6 designated as View A showing further details thereof.
Figure 8:
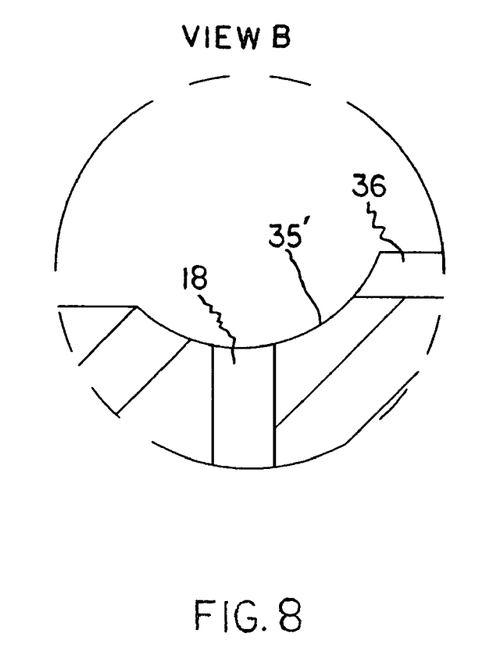
FIG. 8 is an enlarged partial cross-section of the outlined area in FIG. 6 designated as View B showing further details thereof.
Figure 9:
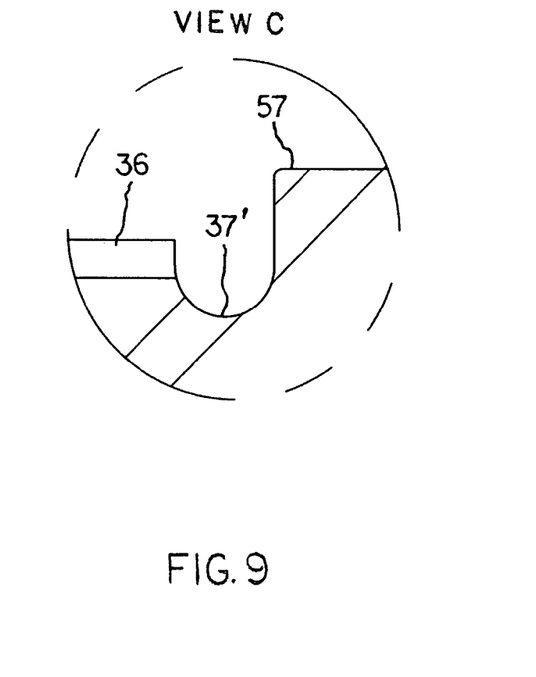
FIG. 9 is an enlarged partial cross-section of the outlined area in FIG. 6 designated as View C showing further details thereof.
Figure 10:
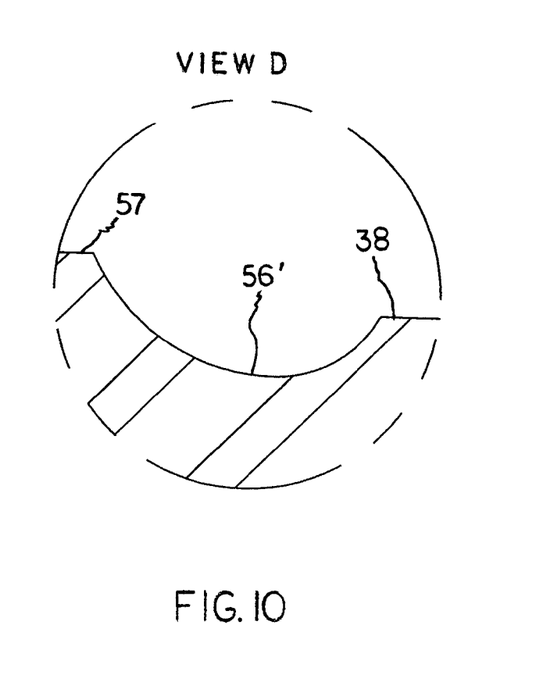
FIG. 10 is an enlarged partial cross-section of the outlined area in FIG. 6 designated as View D showing further details thereof.

In an alternative embodiment shown in FIG. 6 the intermediate shaft assembly 10' includes an elongated, generally cylindrical body member 11' having a central gallery or bore 12' formed along the longitudinal axis -A- thereof comprising a critical portion of the lubrication circuit within the transmissions as described hereinabove. In this embodiment the bore 12' is held to the minimum nominal dimension (ref. Ø 0.250) to strengthen the shaft 10'. The central bore 12' is formed in fluid communication with a plurality of ATF inlets, outlets, and end plug orifices, which deliver ATF under system pressure to provide lubrication for components mounted on the shaft 10' such as the front planetary gears, the overdrive planetary gears, and other mating parts as in the previous embodiment.

It will be appreciated that in the present shaft assembly 10', the ATF inlets, outlets, and end plug orifices are also calibrated to predetermined dimensions to accurately meter the flow of ATF passing through the shaft assembly based on the lubrication requirements of the planetary gears and related components served by the lubrication circuit as in the previous embodiment.

In contrast to the previous embodiment, the present intermediate shaft assembly 10' is provided with a reduced number of ATF outlets including a single ATF feed hole 14' at its forward end (i.e. left end in FIG. 6) drilled intermediate the front planetary spline 30 and a first front sungear journal 32 for delivery of ATF to this portion of the shaft. Shaft assembly 10' also includes a single ATF feed hole 16 drilled intermediate the first and second front sungear journals 32 and 34 respectively for delivery of ATF to this location. Similarly, the shaft assembly 10' includes a single ATF feed hole 18 drilled intermediate the second front sungear journal 34 and the rear planetary spline 36 for delivery of ATF to this portion of the shaft.

At its rearward end the intermediate shaft assembly 10' includes only a single ATF feed hole 20' drilled adjacent the first aft sungear journal 38 for delivery of ATF to this portion of the shaft. The shaft assembly 10' also includes only a single ATF feed hole 22' drilled adjacent the second aft sungear journal 40 for delivery of ATF to this location. Shaft assembly 10' also includes an overdrive planetary spline 45 formed thereon for mating engagement with the overdrive planetary gear assembly (not shown in FIG. 6) as in the previous embodiment.

This embodiment of the intermediate shaft assembly 10' also provides structures comprising fluid metering means including, but not limited to, the following structures. Shaft assembly 10' includes an end pin, indicated generally at 50 (not shown in FIG. 6), having a calibrated center orifice 52 formed therein, which meters the flow of ATF from the forward end of the shaft assembly as shown in FIG. 1. The end pin 50 is installed to an interference fit in the forward end of the internal bore 12' as in the previous embodiment.

Shaft assembly 10' also includes an end plug, indicated generally at 60 (not shown in FIG. 6), having a calibrated center orifice 62, which is installed to an interference fit in the aft end of the bore 12' as in the previous embodiment. Orifices 52 and 62 function to regulate the flow of ATF from either end of bore 12' thereby generating hydraulic fluid backpressure within the bore increasing the volume of ATF discharged through the aforementioned ATF feed holes 14', 16, 20', and 22'.

As in the previous embodiment the calibrated orifices 52, 62 may vary in the range of Ø 0.050-Ø 0.090 inch in order to adjust the fluid backpressure and, thus, the volume of ATF to be discharged through the ATF feed holes 14', 16, 20', and 22' to the planetary gears in a particular transmission.

Another critical problem to be considered in the present redesign of the intermediate shaft is the annular spline relief grooves 33, 37, 43 and journal relief grooves 35, 41, 56 typically formed on the shaft as shown in FIG. 1. Such machined features or discontinuities are called stress raisers, and the regions in which they occur are called areas of stress concentration. The mechanical stresses imposed on the intermediate shaft assembly 10 during peak torque conditions can produce stress fractures as at 200 extending between the spline relief grooves 33, 37, 43, the journal relief grooves 35, 41, 56 and the central gallery 12. Once a crack is initiated, the stress concentration factor becomes greater and the crack progresses more rapidly.

This stress concentration factor is accentuated by the typically rectangular cross-section of the spline relief grooves 33, 37, 43 and the journal relief grooves 35, 41, 56 machined into the shaft 10 of the previous embodiment shown in FIG. 1, which are machined in substantially the same manner as in the OEM shaft. That is, the grooves 33, 37, 43, 35, 41, 56 include relatively sharp corner radii in the range of 0.005-0.015 inches.

Figure 11:
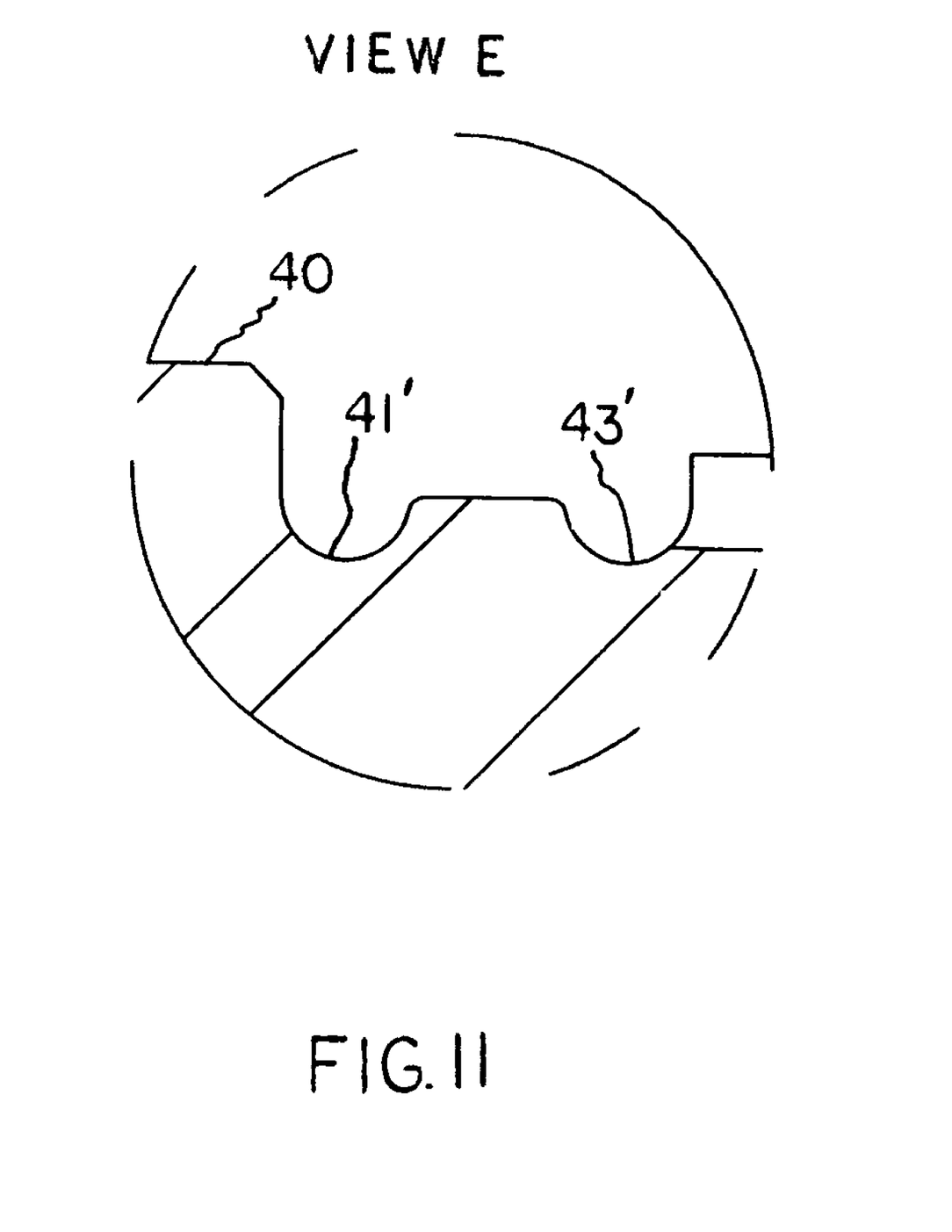
FIG. 11 is an enlarged partial cross-section of the outlined area in FIG. 6 designated as View E showing further details thereof.

Referring again to FIG. 6 it can be seen that the spline relief grooves 33', 37', 43' and journal relief grooves 35', 41', 56' of the present shaft assembly 10' are semicircular in cross-section as more clearly shown in FIGS. 7-10. Such semicircular grooves 33' (FIG. 7), 35' (FIG. 8), 37' (FIG. 9), 43', 41' (FIG. 11), 56' (FIG. 10) function to reduce the stress concentration effect of such grooves by eliminating the aforementioned sharp corner radii included in the corresponding grooves 33, 37, 43, 35, 41, 56 of the embodiment shown in FIG. 1. It is reiterated that in this embodiment the bore 12' is held to the minimum nominal dimension (ref. Ø 0.250) to add overall strength to the shaft 10'. Thus, the present intermediate shaft assembly 10' shown in FIG. 6 is structurally stronger having increased resistance to stress cracks and mechanical shear forces, which are imposed on the shaft assembly 10' under peak torque conditions.

Referring again to FIG. 1, a transitional diameter 85, which extends between the first sungear journal 38 and the second aft sungear journal 40 in shaft assembly 10, has been shown to be a contributing factor in producing stress fractures 200 in proximity to the journal relief groove 41. The cross-sectional area of the transitional diameter 85 (ref. Ø 1.300 inches nominal) has been demonstrated to be rigid and inflexible during peak torque events such as when transitional diameter 85 is subjected to the maximum torque generated in low gear in the transmission. This effectively creates a shear zone as at 200 in proximity to relief groove 41 wherein stress fractures and breakage are routinely observed in the OEM intermediate shaft. Thus, in the present shaft assembly 10' the cross-sectional area of the transitional diameter 85' has been reduced significantly (ref. Ø 1.115 inches nominal) to impart limited axial flexion (i.e. twist) to the shaft assembly 10' during peak torque events to reduce stress fractures and breakage of the shaft. The reduced cross-sectional area (ref. Ø 1.115 inches nominal) of the transitional diameter 85' is calculated based on the mechanical properties (i.e. shear strength) of an improved steel material (300M per MIL-S-83155) and the heat treatment specification (MIL-H-6875G) applied in the manufacture of the present shaft assembly 10'.

Thus, it can be seen that the present invention provides direct replacement, intermediate shaft assemblies 10, 10' featuring redesigned ATF intake ports, which function to increase the angle of entry for ATF entering the intake ports and provide a so-called "scooping" or funneling effect within the surrounding fluid upon shaft rotation. This "scooping" effect serves to increase the volume of ATF flow within the shaft providing improved lubrication for the planetary gear assemblies and other components lubricated by this ATF circuit.

In another embodiment the present invention provides an intermediate shaft assembly 10' including modified spline relief grooves and journal relief grooves, which are semi-circular in cross-section, providing a reduced stress concentration factor and an increased shear strength substantially reducing stress fractures in proximity to such relief grooves. In addition, the cross-sectional area of transitional diameter 85' in shaft assembly 10' has been reduced significantly to impart limited rotational flex (i.e. twist) to the shaft assembly during peak torque events to reduce stress fractures and breakage of the shaft.

Although not specifically illustrated in the drawings, it should be understood that additional equipment and structural components will be provided as necessary and that all of the components described above are arranged and supported in an appropriate fashion to form a complete and operative replacement intermediate shaft incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

We claim:

1. A rotating shaft assembly for an automatic transmission comprising:

a cylindrical body member including a transitional diameter having a predetermined cross-sectional area, said body member including a central bore having a longitudinal axis and at least one annular groove wherein a fluid intaking means is formed in fluid communication with said bore, said fluid intaking means having at least one radially disposed intake port positioned at a predetermined lateral offset position relative to said longitudinal axis, said body member also including a plurality of hydraulic fluid outlet ports formed in fluid communication with said bore for discharging hydraulic fluid to lubricate components assembled thereon, said body member further including a plurality of external splines formed thereon at predetermined locations, wherein each of said splines includes a spline relief groove formed adjacent thereto, said spline relief groove having a semicircular cross-section for reducing stress concentration and providing increased shear strength to said body member; and fluid metering means installed at each end of said bore for restricting the flow of hydraulic fluid from the ends of said bore thereby increasing the flow of hydraulic fluid from said outlet ports.

2. A rotating shaft assembly of claim 1 wherein said intake port includes an undercut surface contiguous with the leading edge of said intake port at its juncture with said annular groove, said undercut surface producing a scooping effect within the hydraulic fluid upon rotation of said shaft assembly thereby increasing the flow of hydraulic fluid into said intake port.

3. A rotating shaft of claim 1 wherein said intake port is located at said lateral offset position being positioned in the range of 0.125 to 0.156 inches from said longitudinal axis.

4. A rotating shaft assembly of claim 1 wherein said fluid metering means comprises a calibrated plug orifice installed within each end of said bore to restrict the flow of hydraulic fluid from each end of said bore thereby generating backpressure to said outlet ports.

5. A rotating shaft assembly of claim 4 wherein said calibrated plug orifices vary in the range of Ø 0.050-0.090 inches.

6. A rotating shaft assembly of claim 1 further including a flexible transitional diameter formed on said body member, said flexible transitional diameter having a reduced cross-sectional area in comparison to said transitional diameter such that said body member is imparted with axial flexion to reduce stress fractures during peak torque events.

7. An intermediate shaft assembly for an automatic transmission comprising:

a cylindrical body member including a transitional diameter having a predetermined cross-sectional area, said body member including a central bore having a longitudinal axis and at least one annular groove wherein a fluid intaking means is formed in fluid communication with said bore, said fluid intaking means including a plurality of radially disposed intake ports being positioned at predetermined lateral offset positions relative to said longitudinal axis, said body member also including a plurality of hydraulic fluid outlet ports formed in fluid communication with said bore for discharging hydraulic fluid lubrication to components assembled thereon, said body member further including a plurality of external splines formed thereon at predetermined locations, wherein each of said splines includes a spline relief groove formed adjacent thereto, said spline relief groove having a semicircular cross-section for reducing stress concentration and providing increased shear strength to said body member; and a calibrated plug orifice installed at each end of said bore for restricting the flow of hydraulic fluid from the ends of said bore thereby increasing the flow of hydraulic fluid from said outlet ports.

8. An intermediate shaft assembly of claim 7 wherein said intake ports include an undercut surface contiguous with the leading edge of each intake port at its juncture with said annular groove, said undercut surface producing a funneling effect within the hydraulic fluid in said annular groove upon rotation of said shaft thereby increasing the flow of hydraulic fluid into said intake ports.

9. An intermediate shaft of claim 7 wherein said intake ports are located at said lateral offset positions in the range of 0.125 to 0.156 inches from either side of said longitudinal axis.

10. An intermediate shaft of claim 7 wherein said calibrated plug orifice varies in the range of Ø 0.050-0.090 inches.

11. An intermediate shaft assembly for an automatic transmission comprising:

a cylindrical body member including a transitional diameter having a predetermined cross-sectional area, said body member including a central bore having a longitudinal axis and at least one annular groove wherein a fluid inlet site is formed in fluid communication with said bore, said fluid inlet site including a plurality of intake ports being positioned at predetermined lateral offset positions relative to said longitudinal axis, said body member also including a plurality of hydraulic fluid outlet ports formed in fluid communication with said bore for discharging hydraulic fluid lubrication to components assembled thereon, said body member further including a plurality of external splines formed thereon at predetermined locations, wherein each of said splines includes a spline relief groove formed adjacent thereto, said spline relief groove having a semicircular cross-section for reducing stress concentration and providing increased shear strength to said body member; and backpressure generating means installed at each end of said bore for generating increased hydraulic pressure within said bore thereby increasing the flow of hydraulic fluid from said outlet ports.

12. An intermediate shaft assembly of claim 11 wherein said intake ports include an undercut surface contiguous with the leading edge of each intake port at its juncture with said annular groove, said undercut surface producing a scooping effect within the hydraulic fluid in said annular groove upon rotation of said shaft thereby increasing the flow of hydraulic fluid into said intake ports.

13. An intermediate shaft of claim 11 wherein said intake ports are located at said lateral offset positions in the range of 0.125 to 0.156 inches from either side of said longitudinal axis.

14. An intermediate shaft assembly of claim 11 wherein said backpressure generating means comprises a calibrated plug orifice installed within each end of said bore to restrict the flow of hydraulic fluid from said bore thereby generating backpressure to said outlet ports.

15. An intermediate shaft assembly of claim 14 wherein said calibrated plug orifice varies in the range of Ø 0.050-0.090 inches.

* * * * *